US008484119B2

(12) United States Patent
Markov et al.

(10) Patent No.: US 8,484,119 B2
(45) Date of Patent: *Jul. 9, 2013

(54) SYSTEM AND METHOD FOR VISUALIZATION OF RESULTS OF MULTI-CRITERIA FINANCIAL OPTIMIZATIONS

(75) Inventors: Michael Markov, Short Hills, NJ (US); Anna Sotnichenko, Millburn, NJ (US)

(73) Assignee: Markov Processes International, LLC, Summit, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/026,860

(22) Filed: Feb. 14, 2011

(65) Prior Publication Data
US 2011/0178954 A1    Jul. 21, 2011

Related U.S. Application Data

(63) Continuation of application No. 11/125,946, filed on May 10, 2005, now Pat. No. 7,890,406.

(60) Provisional application No. 60/571,570, filed on May 13, 2004.

(51) Int. Cl.
*G06Q 40/00* (2012.01)
(52) U.S. Cl.
USPC .............................. 705/36 R; 705/35; 705/37
(58) Field of Classification Search
USPC .......................................... 705/36 R, 35, 37
See application file for complete search history.

(56) References Cited

U.S. PATENT DOCUMENTS

| | | | |
|---|---|---|---|
| 7,542,932 B2 * | 6/2009 | Chalermkraivuth et al. ... | 705/35 |
| 2003/0088492 A1 * | 5/2003 | Damschroder ................. | 705/36 |
| 2004/0186814 A1 * | 9/2004 | Chalermkraivuth et al. ... | 706/16 |
| 2005/0119959 A1 * | 6/2005 | Eder .............................. | 705/36 |
| 2005/0187844 A1 * | 8/2005 | Chalermkraivuth et al. ... | 705/36 |
| 2005/0187845 A1 * | 8/2005 | Eklund et al. ................. | 705/36 |
| 2005/0187846 A1 * | 8/2005 | Subbu et al. .................. | 705/36 |
| 2005/0187847 A1 * | 8/2005 | Bonissone et al. ............ | 705/36 |
| 2005/0187848 A1 * | 8/2005 | Bonissone et al. ............ | 705/36 |
| 2005/0187849 A1 * | 8/2005 | Bollapragada et al. ........ | 705/36 |

* cited by examiner

*Primary Examiner* — Thomas M. Hammond, III
*Assistant Examiner* — Kevin Poe
(74) *Attorney, Agent, or Firm* — Fay Kaplun & Marcin, LLP

(57) ABSTRACT

Described is a system including a memory arrangement and a processor for graphically representing in a space data representing at least one portfolio. The memory arrangement stores a Multi-Criteria Financial Optimization ("MCFO"). The processor solves the MCFO to generate data corresponding to a set of portfolios. The processor selects vertex points corresponding to a set of components of the portfolios. The processor defines coordinates of the vertices on a chart and plots the vertices as points on the chart. The processor defining a projection vector-function using coordinates of the vertices and selecting a subset of the portfolios on the chart. The processor computing coordinates for the portfolios in the subset using the projection vector-function and a weighting corresponding to the portfolios. The processor plotting points corresponding to the portfolios in the subset on the chart using the computed coordinates.

26 Claims, 4 Drawing Sheets

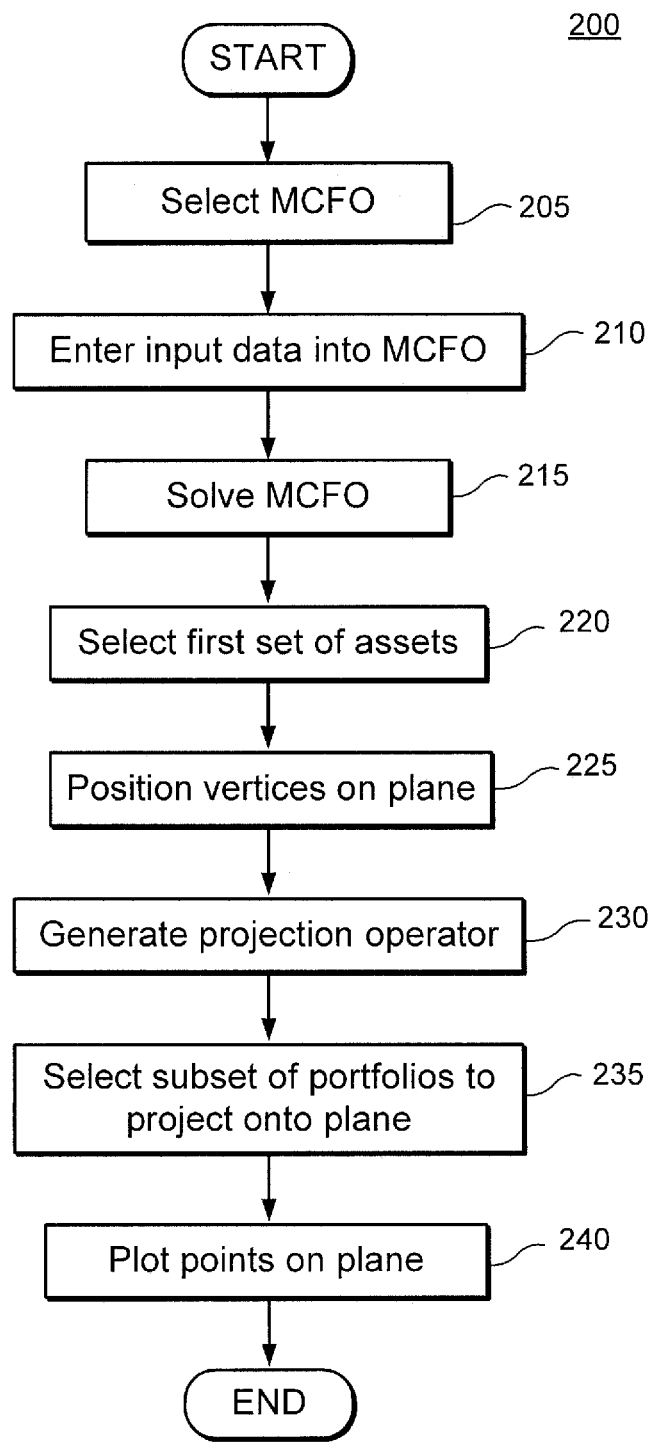
F I G. 2

SYSTEM AND METHOD FOR VISUALIZATION OF RESULTS OF MULTI-CRITERIA FINANCIAL OPTIMIZATIONS

PRIORITY/INCORPORATION BY REFERENCE

The present application is a Continuation application of U.S. patent application Ser. No. 11/125,946 filed on May 10, 2005 which claims priority to U.S. Provisional Patent Application Ser. No. 60/571,570 filed on May 13, 2004, the entire disclosure of both applications are expressly incorporated herein by reference.

BACKGROUND OF THE INVENTION

Optimization models are widely used in finance where they are employed primarily in two major portfolio-based applications: Asset Allocation models and Portfolio Construction models. The Asset Allocation models are used to create major strategic allocations for an investment portfolio, such as a pension fund with one or more broad market segments (e.g., equity, fixed income, real estate, cash, etc). The Portfolio Construction models are used to create portfolios consisting of specific securities having very specific implementation constraints and objectives, such as trading efficiency, purchase constraints, etc.

Results generated by the models are typically represented graphically on one or more Efficient Frontier charts, which may simply be line graphs plotted on x-(risk) and y-(return) axes. However, these charts do not provide analysis in terms of a distance from each asset class within the portfolio. For example, the line graphs do not show trends in risk/return scenarios for each asset class.

SUMMARY OF THE INVENTION

The present invention relates to a system including a memory arrangement and a processor for graphically representing in a space data representing at least one portfolio. The memory arrangement stores a Multi-Criteria Financial Optimization ("MCFO"). The processor solves the MCFO to generate data corresponding to a set of portfolios. The processor selects vertex points corresponding to a set of components of the portfolios. The processor defines coordinates of the vertices on a chart and plots the vertices as points on the chart. The processor defining a projection vector-function using coordinates of the vertices and selecting a subset of the portfolios on the chart. The processor computing coordinates for the portfolios in the subset using the projection vector-function and a weighting corresponding to the portfolios. The processor plotting points corresponding to the portfolios in the subset on the chart using the computed coordinates.

BRIEF DESCRIPTION OF THE DRAWINGS

FIG. 2 shows an exemplary embodiment of a method according to the present invention;

DETAILED DESCRIPTION

Figure 1:
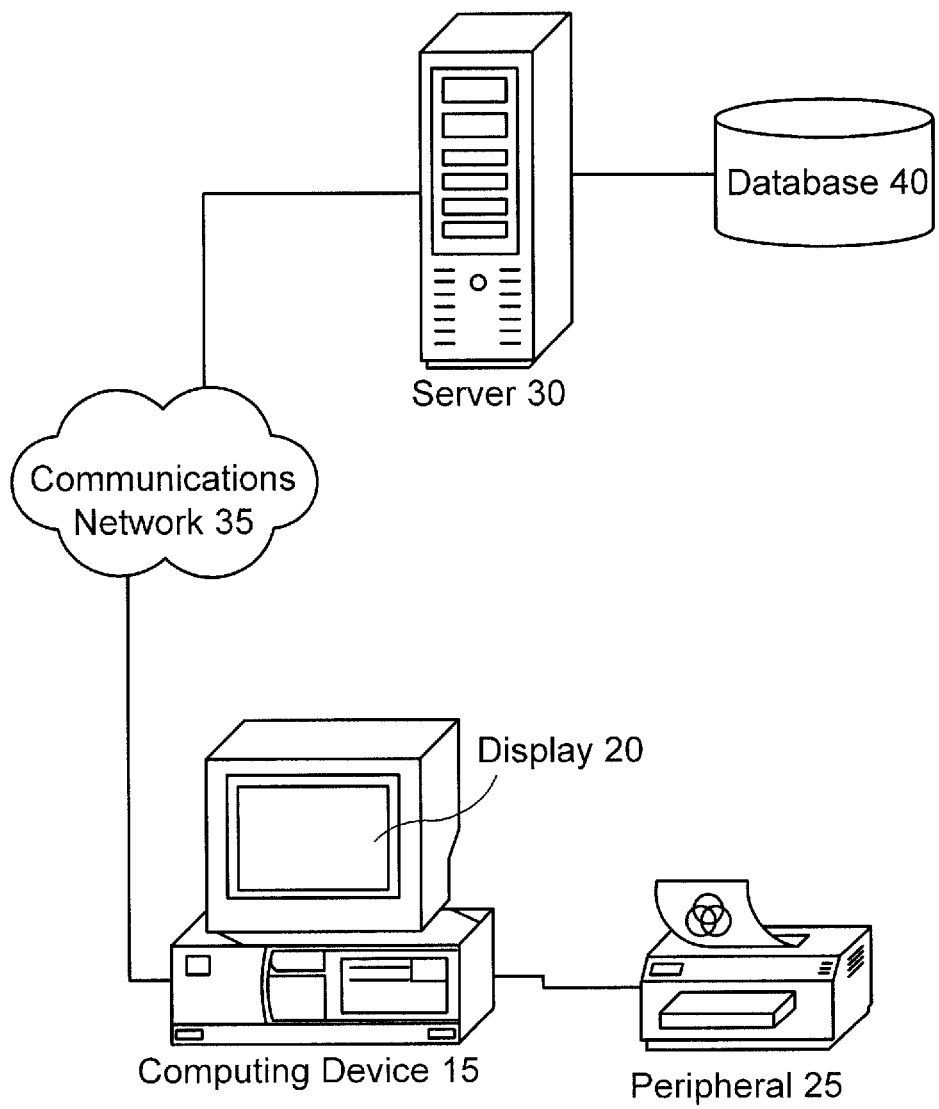
FIG. 1 shows an exemplary embodiment of a system according to the present invention.

The present invention may be further understood with reference to the following description and the appended drawings, wherein like elements are referred to with the same reference numerals. The present invention relates to a visualization of results generated by one or more optimization models, and in particular, generation of a chart showing one or more portfolios created as a result of solving one or more multi-criteria financial optimizations.

As shown in FIG. 1, an exemplary embodiment of a system 10 according to the present invention may include a computing device 15 connected to a display 20 and a peripheral 25. The computing device 15 may be a personal computer, a laptop, a server or any other device which includes a processor and a memory for storing applications executable by the processor. The display 20 may be a cathode-ray tube, a liquid crystal display or any other device allowing for visualization of data generated by the computing device 15. The peripheral 25 may be, for example, a printer which generates a hard copy of an image(s) shown on the display 20. In other embodiments, the peripheral 25 may be a portable device (e.g., PDA, laptop, handheld computer) which receives the data from the computing device 15. In this manner, the data may be transferred between the computing device 15 and a further computing device (e.g., office PC, home PC, etc.) via the portable device.

The computing device 15 may be connected to a server 30 via a communications network 35. In one embodiment, the computing device 15 is one component of a local area network ("LAN"). The LAN may further comprise one or more further computing devices, one or more portable devices and one or more peripherals. The components of the LAN may be connected to the server 30, either directly or indirectly, via wired connections. In this manner, the computing device 15 may access a database 40 coupled to the server 30 and any device connected to the LAN. Alternatively or additionally, the LAN may have one or more components (e.g., wireless access points, wireless routers, wireless switches) which provide for a wireless access to the server 30 (e.g., a WLAN). In the WLAN embodiment, the peripheral 25 (including the portable device(s)) may have a wireless communication capability allowing them to communicate with the server using radio frequency signals. In this embodiment, the computing device 15 may be equipped with the portable device (e.g., a network interface card ("NIC")) providing the computing device 15 with the wireless communication capability.

According to the present invention, the memory of the computing device 15 may store a set of instructions for generating a graphical representation of data created by solving a Multi-Criteria Financial Optimization ("MCFO"). As understood by those of skill in the art, the set of instructions may be stored on a memory of any device accessible by the computing device 15 (i.e., via the LAN, WLAN, etc.). Furthermore, the set of instructions may be implemented in hardware (e.g., hardwired into a circuit) or software (e.g., application, module, etc.).

The MCFO may be selected by a user (e.g., customer, service-provider) and/or as a function of one or more preselected factors. For example, in one embodiment, the MCFO is selected as a function of a number and/or a type of financial instruments (e.g., T-bills, bonds, equities, etc.) which may be used as input data into the MCFO. In another embodiment, the MCFO may be selected as a function of a total budget and/or an expected risk/return. For example, the customer may indicate that he has a predefined monetary budget which may be distributed between one or more financial instruments which will generate a predefined risk/return.

An exemplary embodiment of the MCFO which may be utilized by the present invention is explained in Harry M. Markowitz, *Portfolio Selection*, Journal of Finance, vol. 7(1) (1952), Harry M. Markowitz, *The Optimization of a Quadratic Function Subject to Linear Constraints*, Naval Research Logistics Quarterly, vol. 3 (1956), and Harry M. Markowitz, *Mean-Variance Analysis in Portfolio Choice and Capital Markets*, Basil Blackwell, Inc., Cambridge, Mass. (1987), the disclosures of which are incorporated, in their entirety, herein.

A goal of the MCFO may be to maximize an investment return E, while simultaneously minimizing an investment risk V, subject to various constraints. In one embodiment, the MCFO is a Mean-Variance Optimization. The Mean-Variance Optimization may be defined as a solution of the following optimization problem:

$$F(\bar{r}_p) = \underset{w}{\mathrm{argmin}}[w'Cw] = \underset{w_1,\ldots,w_n}{\mathrm{argmin}}\left[\sum_{i=1}^n \sum_{j=1}^n c_{ij} w_i w_j\right] \quad (1)$$

subject to $$w'1 = \sum_{i=1}^n w_i = 1$$

$$w'e = \sum_{i=1}^n w_i e_i = \bar{r}_p$$

$$w_i \geq 0$$

where a set of constraints are the following $n$ - number of base assets (asset classes or individual securities);

$w$ - $n$-dimension vector of unknown weights of assets in an optimal portfolio;

$C$ - $n \times n$ asset covariance matrix (estimate);

$w'Cw$ - portfolio variance;

$e$ - $n$-vector of asset expected returns (estimate);

$\bar{r}_p$ - portfolio returns (varying parameter).

Varying the $\bar{r}_p$ value and solving the Mean-Variance Optimization generates a set of optimal solution vectors x providing a minimal level of a portfolio risk for each of the $\bar{r}_p$ values. The set may be referred to as an Efficient Set, and when the Efficient Set is plotted in a risk-return space, it may also be referred to as an Efficient Frontier.

The set of constraints represent one or more optional non-negativity conditions on a weight of each asset in a portfolio and also an optional budget constraint (a condition of a fully invested portfolio, i.e., a sum of the weights of all the assets is equal to 1 or 100%).

The Mean-Variance Optimization may further be defined in terms of an investor's Utility Function defined in terms of the risk V, the return E and a risk tolerance parameter $\lambda$:

$$F(\lambda) = \underset{w}{\mathrm{argmin}}[V(w) - \lambda E(w)] \quad (2)$$

subject to $\Omega(w)$ - constraintset where the Efficient Set $F(\lambda)$ may be obtained by varying the tolerance parameter $\lambda$ and solving the corresponding Mean-Variance Optimization. Further, the tolerance parameter $\lambda$ may be an absolute value, in that, in one embodiment, it may not be a negative value.

In another exemplary embodiment, the Mean-Variance Optimization may be formulated as follows:

$$F(\lambda) = \underset{w}{\mathrm{argmin}}[w'Cw - \lambda w'e] = \underset{w_1,\ldots,w_n}{\mathrm{argmin}}\left[\sum_{i=1}^n \sum_{j=1}^n c_{ij} w_i w_j - \lambda \sum_{i=1}^n e_i w_i\right] \quad (3)$$

subject to $$w'1 = \sum_{i=1}^n w_i = 1$$

$$w_i \geq 0$$

The above-described embodiments of the Mean Variance Optimization have a quadratic objective function which is usually solved using a quadratic optimization algorithm (i.e., that described by Markowitz).

In practice, MCFOs may utilize various measures of the risk, sets of constraints and/or objective functions, much more complex than the Utility Function defined above. For example, a model constraint set $\Omega(w)$ may include one or more general linear, piece-wise linear and non-linear constraints. The model constraint set $\Omega(w)$ may further include an individual bound on a weight(s) thereof providing an extension to the non-negativity constraints utilized in the Mean Variance Optimizations and the Utility Function. For example, in one embodiment, the constraint set $\Omega(w)$ may be defined as follows:

$$\Omega(w) = \quad (4)$$

$$\begin{cases} Aw \geq b - \text{general linear (group) inequality constraints} \\ Bw = b - \text{general linear (group) equality constraints} \\ 1 \leq w \leq u - \text{bound constraints} \\ 1'\min(0, w) = \sum_{j=1}^n \min(0, w_j) \geq s - \text{``short'' limit constraint} \\ 1'\mathrm{abs}(w - w_0) = \sum_{j=1}^n \mathrm{abs}(w_j - w_{0j}) \leq t - \text{``turnover'' constraint} \end{cases}$$

where:

$w_0$ - current weights of securities/assets in the portfolio

A first constraint (e.g., an inequality constraint) within the constraint set $\Omega(w)$ may relate to a limit on a weighted sum of a portfolio allocation within a certain group(s) (e.g., a sector or a market segment). Other embodiments of the inequality constraint may involve a relationship between two or more groups of assets where a first group is used to hedge (i.e., offset) exposure to at least a second group, or vice-versa. A second constraint (e.g., the budget constraint described above) is an example of an equality constraint. A third constraint (e.g., a "short" limit constraint) and a fourth constraint (e.g., a "turnover" constraint) are examples of a piece-wise, linear constraint defined as a function of a vector of weight x. The third constraint may control a sum of all negative positions in the portfolio. The fourth constraint may limit a change in the weight x with respect to current portfolio holdings.

In addition to the Mean-Variance Optimization, other embodiments of the MCFO include, but are not limited to, a Mean-Semivariance Optimization, a Mean-Semivariance Below Target Optimization and a general Mean-Lower Partial Moments Optimization models described in Harry M. Markowitz, *Mean-Variance Analysis in Portfolio Choice and Capital Markets*, Basil Blackwell, Inc., Cambridge, Mass. (1987), Vijay S. Bawa, *Optimal Rules for Ordering Uncertain Prospects*, Journal of Financial Economics, vol. 2(1) (1975), Roger P. Bay, *Estimating the Optimal Stochastic Dominance Efficient Set with a Mean-Semivariance Algorithm*, Journal of Financial and Quantitative Analysis, vol. 14(5) (1979), Peter C. Fishburn, *Mean-Risk Analysis with Risk Associated with Below-Target Returns*, American Economic Review, vol. 67(2) (1977), W. V. Harlow, *Asset Allocation in a Downside-Risk Framework*, Financial Analyst Journal, vol. 47(5) (1991), William W. Hogan & James M. Warren, *Toward the Development of an Equilibrium Capital-Market Model Based on Semivariance*, Journal of Financial and Quantitative Analysis, vol. 9(1) (1974), Robert C. Klemkosky, *The Bias in Composite Performance Measures*, Journal of Financial and Quantitative Analysis, vol. 8(3) (1973), David Nawrocki, *A Comparison of Risk Measures When Used in a Simple Portfolio Selection Heuristic*, Journal of Business Finance and Accounting, vol. 10(2) (1983), and William F. Sharpe, *A Linear Programming Algorithm for Mutual Fund Portfolio Selection*, Management Science, vol. 13(7) (1967), the disclosures of which are incorporated, in their entirety, herein.

Embodiments of the MCFO are further described in U.S. Pat. No. 6,292,787 entitled "Enhancing Utility and Diversifying Model Risk in a Portfolio Optimization Framework" naming Jason S. Scott et al. as inventors, U.S. Pat. No. 6,275,814 entitled "Investment Portfolio Selection System and Method" naming Joseph E. Giansante et al. as inventors, U.S. Pat. No. 6,219,650 entitled "Method of Determining Optimal Asset Allocation Utilizing Asset Cash Flow Simulation" naming Edward H. Friend et al. as inventors, U.S. Pat. No. 6,078,904 entitled "Risk Direct Asset Allocation and Risk Resolved CAPM for Optimally Allocating Investment Assets in an Investment Portfolio" naming George J. Rebane as inventor, U.S. Pat. No. 6,055,517 entitled "Method of Determining Optimal Asset Allocation Utilizing Asset Cash Flow Simulation" naming Edward H. Friend et al. as inventors, U.S. Pat. No. 6,003,018 entitled "Portfolio Optimization by Means of Resampled Efficient Frontiers" naming Richard O. Michaud et al. as inventors, each of which is incorporated, in its entirety, herein.

Several embodiments of the MCFO according to the present invention will be described below. These embodiments may be utilized, for example, in an Asset Allocation and/or a Portfolio Optimization. The constraints used with these embodiments may be those, or substantially similar to those as described above with reference to the constraint set $\Omega(w)$. Although objective functions and the methods to solve these optimizations vary, a common feature of these models lies in their multi-criteria nature and the results of these optimizations can be presented as the Efficient Set $F(\lambda)$ of optimal portfolios.

In one exemplary embodiment, the MCFO is the Mean-Semivariance model provided by the following illustrative formula:

$$F(\lambda) = \underset{w_1,\ldots,w_n}{\mathrm{argmin}}\left[\sum_{m=1}^{t}\max\left(0, \frac{1}{t}\sum_{k=1}^{t}\sum_{j=1}^{n}w_j r_{jk} - \sum_{i=1}^{n}w_i r_{im}\right)^2 - \lambda\frac{1}{t}\sum_{k=1}^{t}\sum_{j=1}^{n}w_j r_{jk}\right] \quad (5)$$

subject to $\Omega = (w_1, \ldots, w_n) -$ constraints where:

$n$ - number of assets or securities in the portfolio $t$ - number of periods for which historical returns of each asset are available $w$ - $n$-vector of unknown weights $r_{j,k}$ - $n \times t$ matrix of assets historical returns $\lambda$ - scalar non-negative parameter of optimization A first term of the Mean-Semivariance model is a measure of the risk and is a piece-wise quadratic function: a sum over all historical periods of squared negative deviations of portfolio return for a particular period from the portfolio's estimated mean return. A second term of the Mean-Semivariance model is equal to an expected return of the portfolio, estimated from one or more asset historical returns, multiplied by the parameter $\lambda$.

In another exemplary embodiment, the MCFO is the Mean-Semivariance Below Target model which may be similar to the Mean-Semivariance model above, but include a different deviation measured from a given constant (or a time series) target return rather than from a mean return:

$$F(r, \lambda) = \underset{w_1,\ldots,w_n}{\mathrm{argmin}}\left[\sum_{m=1}^{t}\max\left(0, r - \sum_{i=1}^{n}w_i r_{im}\right)^2 - \lambda\frac{1}{t}\sum_{k=1}^{t}\sum_{j=1}^{n}w_j r_{jk}\right] \quad (6)$$

subject to $\Omega = (w_1, \ldots, w_n) -$ constraints where $r$ - given target return In a further exemplary embodiment, the MCFO is a Mean-Lower Partial Moments (LPM) model which may allow one or more arbitrary moments:

$$F(\lambda) = \underset{w_1,\ldots,w_n}{\mathrm{argmin}}\left[\sum_{m=1}^{t}\max\left(0, \frac{1}{t}\sum_{k=1}^{t}\sum_{j=1}^{n} w_j r_{jk} - \sum_{i=1}^{n} w_i r_{im}\right)^d - \lambda\frac{1}{t}\sum_{k=1}^{t}\sum_{j=1}^{n} w_j r_{jk}\right] \quad (7)$$

subject to $\Omega = (w_1, \ldots, w_n) - \text{constraints}$

In yet a further embodiment, the MCFO is a Below Target LPM model:

$$F(r, \lambda) = \underset{w_1,\ldots,w_n}{\mathrm{argmin}}\left[\sum_{m=1}^{t}\max\left(0, r - \sum_{i=1}^{n} w_i r_{im}\right)^d - \lambda\frac{1}{t}\sum_{k=1}^{t}\sum_{j=1}^{n} w_j r_{jk}\right] \quad (8)$$

subject to $\Omega = (w_1, \ldots, w_n) - \text{constraints}$

In the Mean-LPM and the Below Target LPM models shown above, a parameter d may be a nonnegative, real value to match an investor's risk aversion. For example, the value of the parameter d may be equal to 0, 1 or 2. If, for example, the value of the parameter d is equal to 2, the Mean-LPM and the Below Target LPM models may be equivalent to the Mean-Semivariance and Mean-Semivariance Below Target models, respectively.

In another aspect of the present invention, the MCFO may be a Portfolio Optimization used to create one or more portfolios from which the investor may choose. In practice, the Portfolio Optimization may require one or more specific objective functions which incorporate a transaction cost(s) and/or a tracking penalty. For example, in one embodiment, the Portfolio Optimization may be defined in a matrix form as follows:

$$F(\lambda) = \underset{w}{\mathrm{argmin}}[(w - w_b)'C(w - w_b) - \lambda(w'e - p'\max(0, w - w_0) - q'\min(0, w - w_0))] \quad (9)$$

subject to $\Omega(w_1, \ldots, w_n) - \text{constraints}$ where $p'$ - vector of purchase costs ($> 0$)

$q'$ - vector of sales costs ($< 0$)

$w_b$ - given weights of securities/assets in the benchmark portfolio $C$ - covariance matrix of securities $w_0$ - current weights of securities/assets in the portfolio One goal of the Portfolio Optimization may be to maximize an expected return x'e and minimize tracking of a benchmark return(s) with minimal transaction costs.

In yet a further exemplary embodiment, the MCFO may be a General Optimization which may be formulated as follows:

$$F(\mu_1, \ldots, \mu_m) = \underset{w}{\mathrm{argmin}}\left[R(w) + \sum_{k=1}^{m}\mu_k O_k(w)\right] \quad (10)$$

subject to $\Omega(w_1, \ldots, w_n) - \text{constraints}$ $\mu_{0k} \leq \mu_k \leq \mu_{1k}$ where:

$R(w)$ - any function of portfolio weights, representing investor's risk $O_k(w)$ - a set of "m" functions of portfolio weights, representing investor's objectives $\mu_k$ - a set of "m" optimization parameters $\mu_{0k}$ - real constant or $-$ infinity $\mu_{1k}$ - real constant or infinity While some the embodiments of the MCFO shown above are focused on the expected return, those of skill in the art will understand that there are a plurality of objectives which may represent a plurality of special interests to investors, such as, for example, a yield, a selection return, an allocation in a specific region, etc. In addition, the user may choose a function of portfolio weights as the objective, or as one of the objectives. Thus, the General Optimization may be manipulated to vary the objectives, instead of varying the set of "m" optimization parameters $$F = \underset{w}{\mathrm{argmin}}[R(w)] \quad (11)$$

subject to $\left\{\begin{array}{l}\Omega(w_1, \ldots, w_n) \\ O_k(w) = \overline{o}_{kp}\end{array}\right\}$ where:

$\overline{o}_{kp}$ - set of "m" varying parameters;

$\underset{w}{\min}[O_k(w)] \leq \overline{o}_{kp} \leq \underset{w}{\max}[O_k(w)]$ In general, an output of the General Optimization problem is an "m"-parametric family of portfolios $w_{\mu_0, \mu_1, \ldots, \mu_m}$, which may be referred to the Efficient Set of portfolios. As will be described below, any one-parametric subset of the Efficient Set may be defined as follows:

$$F(\lambda) = w_{\mu_0(\lambda), \mu_1(\lambda), \ldots \mu_m(\lambda)} = w_\lambda$$

In each embodiment, the MCFO outputs the set (e.g., a parametric continuous set) of portfolios of assets as follows:

$$F(\lambda) = \{(w_1, \ldots, w_n)_\lambda\}_{\lambda \in \Phi} \quad (12)$$

where each portfolio is defined by a vector of asset weights $(w_1, \ldots, w_n)$ which attains a highest possible return for each level of risk, or, equivalently, a lowest possible risk for each level of return.

According to the present invention, a graphical representation of the Efficient Set of portfolios and any of subset(s) thereof may be utilized to visualize results of the MCFO. The representation may allow the user to analyze the portfolios in terms of a distance from each of the asset classes (e.g., economic sector, country, region, financial instrument, etc.) and/or a certain group of the asset classes. For example, the representation may allow the user to visualize the portfolios as being "closer to an asset A than to an asset B" in a measurement (e.g., a metric) on the display 20 and/or in a printout from the peripheral 25. Further, the representation may allow the user to visualize a trend in the distance as a point moves from a lower risk (return) to a higher risk (return).

An exemplary embodiment of a method 200 according to the present invention is shown in FIG. 2. In step 205, the MCFO is selected. As described above, the MCFO may be any model for creating the Efficient Set of portfolios. In particular, the MCFO may be any of the conventional Asset Allocation or Portfolio Optimization models. The MCFO which is selected may include a predetermined size n (e.g., a number of assets) which is used to construct the Efficient Set of portfolios. In one embodiment, one or more linear constraints may be imposed on the MCFO selected. For example, the non-negativity constraint limiting the weights of the Efficient Set of portfolios to values between 0 (or 0%) and 1 (or 100%) may be imposed. Further, the budget constraint may state that a sum of the weights should equal 1 (or 100%).

As an illustrative example, the method 200 will be described as if the Mean Variance model is selected. Also, the following assets will be considered: (1) Cash, (2) US Bonds, (3) International Bonds, (4) Large Growth US Equities, (5) Large Value US Equities, (6) Small Capitalization US Equities and (7) International Equities. Thus, the predetermined size n is 7. However, those of skill in the art will understand that the MCFO and the predetermined size n have been selected at random and the present invention may use any MCFO with any predetermined size.

In step 210, input data is entered into the MCFO. In one embodiment, the input data is one or more parameters which may be based on, for example, the historical performance data of each of the assets. The input data may further include the covariance matrix used in the Mean Variance model. In the illustrative example, the input data may be entered as follows:

|  | Exp. Return | Covar with Cash | Covar with US Bonds | Covar with Int'l Bonds | Covar with Large Growth | Covar with Large Value | Covar with Small Cap | Covar with Int'l Equity |
|---|---|---|---|---|---|---|---|---|
| Cash | 4.4 | 0.3 | 0.2 | −0.3 | 0.4 | 0.0 | −0.8 | −1.1 |
| US Bonds | 7.8 | 0.2 | 15.0 | 19.6 | 8.3 | 9.2 | 2.1 | 5.8 |
| Int'l Bonds | 8.9 | −0.3 | 19.6 | 147.5 | −3.6 | −5.6 | −10.6 | 52.9 |
| Large Growth | 10.9 | 0.4 | 8.3 | −3.6 | 332.4 | 190.0 | 261.4 | 187.5 |
| Large Value | 12.1 | 0.0 | 9.2 | −5.6 | 190.0 | 195.1 | 174.4 | 138.7 |
| Small Cap | 12.2 | −0.8 | 2.1 | −10.6 | 261.4 | 174.4 | 362.3 | 177.3 |
| Int'l Equity | 5.1 | −1.1 | 5.8 | 52.9 | 187.5 | 138.7 | 177.3 | 289.1 |

The input data may further include one or more expected returns for the Mean Variance model in the illustrative example. The expected return(s) may be embodied in a return vector as follows:

|  | Expected Return (%) |
|---|---|
| Eff Point 1 | 4 |
| Eff Point 2 | 5 |
| Eff Point 3 | 6 |
| Eff Point 4 | 7 |
| Eff Point 5 | 8 |
| Eff Point 6 | 9 |
| Eff Point 7 | 10 |
| Eff Point 8 | 11 |
| Eff Point 9 | 12 |

In step 215, the MCFO is solved by any known method to generate the Efficient Set of portfolios. In the illustrative example, the Mean Variance model may be solved by a quadratic solver which satisfies the non-negativity constraint(s) and the budget constraint(s), while producing the lowest value of the risk for each level of return in the return vector shown above. Thus, solving the MCFO produces an output data which is the Efficient Set of portfolios including one portfolio for each level of return in the vector. Regardless of the MCFO or the method used to solve it, the result always represents an Efficient Set of portfolios, $F(\lambda)=\{(w_1, \ldots, w_n)_\lambda\}_{\lambda \in \Phi}$, of n-vectors, each having a corresponding weight in each portfolio. Each portfolio includes the weight for each asset which, in the illustrative example, is shown as follows:

|  | Cash | US Bonds | Int'l Bonds | Large Growth | Large Value | Small Cap | Int'l Equity |
|---|---|---|---|---|---|---|---|
| Eff Point 1 | 0.81 | 0.17 | 0.00 | 0.00 | 0.01 | 0.01 | 0.00 |
| Eff Point 2 | 0.62 | 0.34 | 0.00 | 0.00 | 0.02 | 0.02 | 0.00 |
| Eff Point 3 | 0.43 | 0.51 | 0.00 | 0.00 | 0.03 | 0.03 | 0.00 |
| Eff Point 4 | 0.24 | 0.68 | 0.00 | 0.00 | 0.04 | 0.03 | 0.00 |
| Eff Point 5 | 0.04 | 0.86 | 0.00 | 0.00 | 0.06 | 0.04 | 0.00 |
| Eff Point 6 | 0.00 | 0.66 | 0.08 | 0.00 | 0.20 | 0.05 | 0.00 |
| Eff Point 7 | 0.00 | 0.35 | 0.19 | 0.00 | 0.39 | 0.07 | 0.00 |
| Eff Point 8 | 0.00 | 0.04 | 0.30 | 0.00 | 0.58 | 0.08 | 0.00 |
| Eff Point 9 | 0.00 | 0.00 | 0.04 | 0.00 | 0.85 | 0.11 | 0.00 |

In step 220, a subset of assets is selected from the n assets. Those of skill in the art will understand that the subset of assets may be any number of assets according to a formula $m \leq n$, wherein m is a number of assets selected to be into the subset. As will be described below, the subset of assets may be projected onto a space (e.g., a two-dimensional ("2D") plane, a 3D space) in the form of a chart to generate a set of vertices for the plane. That is, the subset of assets may be vertex points on the plane. However, the vertices may or may not relate precisely to the assets involved the MCFO. For example, the weights of a plurality of the assets may be combined and mapped to a single vertex point. In the illustrative example, the subset is 3 assets: (1) Large Growth US Equities, (2) Large Value US Equities and (3) Small Capitalization US Equities.

Figure 3:
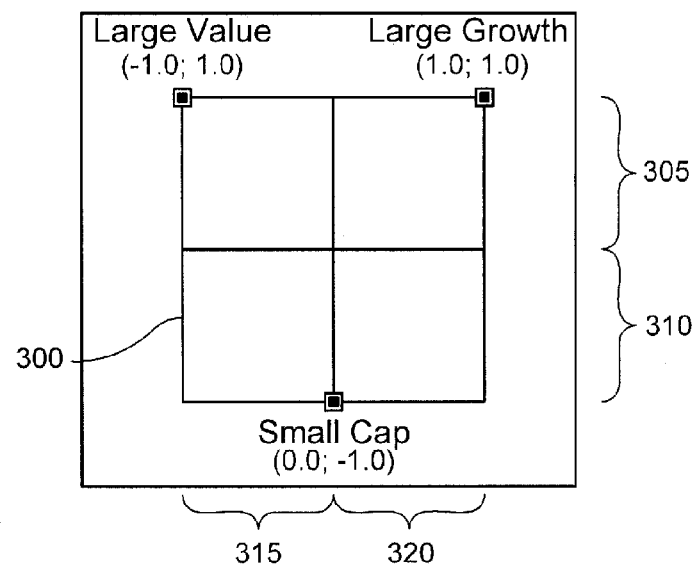
FIG. 3 shows an exemplary embodiment of a two-dimensional ("2D") plane according to the present invention.

In step 225, each vertex from the first set of vertices is positioned on the plane. In one embodiment, a position for each vertex may be arbitrarily chosen by the computing device 15 or the user. An exemplary embodiment of the plane with the first set of vertices positioned thereon according to the illustrative example is shown in FIG. 3. In this example, a border 300 may represent an entire US equity market. Within the border 300, an upper portion 305 may represent large capitalization stocks, while a lower portion 310 represents smaller capitalization stocks. Further, a left portion 315 may represent market stocks, while a right portion 320 represents growth stocks. One or more indices of the border 300 may be labeled with the first set of assets previously selected. For example, Large Growth US Equities are positioned at an index having X-Y coordinates (1.0, 1.0). Those of skill in the art will understand that in the 3D space, the X-Y coordinates will further include a Z-coordinate.

In step 230, a projection operator is generated for projecting the Efficient Set of portfolios onto the plane. In one embodiment, the first set of vertices is defined as follows:

$$v_1 = \begin{pmatrix} x_1 \\ y_1 \end{pmatrix}, \ldots, v_m = \begin{pmatrix} x_m \\ y_m \end{pmatrix} \quad (13)$$

where $v_1$ corresponds to a first vertex, ... , $v_m$ -to an $m$-th vertex.

For each n-vector of asset weights w of portfolios in the Efficient Set, a projection operator P may compute X and Y coordinates for mapping each portfolio onto the plane as follows:

$$P(w) = \begin{pmatrix} x_w \\ y_w \end{pmatrix} \quad (14)$$

where $$x_w = f_x(w)$$

$$y_w = f_y(w)$$

According to the present invention, each of the n single-asset portfolios is projected into vertex points onto the plane. A condition can be formulated as follows:

$$P([1, 0, \ldots, 0]') = \begin{pmatrix} x_{i_1} \\ y_{i_1} \end{pmatrix} \quad (15)$$

$$P([0, 1, \ldots, 0]') = \begin{pmatrix} x_{i_2} \\ y_{i_2} \end{pmatrix}$$

$$\ldots$$

$$P([0, 0, \ldots, 1]') = \begin{pmatrix} x_{i_n} \\ y_{i_n} \end{pmatrix}$$

where $i_1, \ldots, i_n \in (1, \ldots, m)$

As understood by those of skill in the art, the projection operator P may be any linear or non-linear vector-function satisfying the condition. In this embodiment, two or more single-asset unit weight vectors can be projected into the same vertex point.

In one embodiment, the projection operator P is a linear projector which satisfies the condition and may be defined as a 2×n matrix operator M formed by coordinate vectors of the first set of vertices as follows:

$$M = \begin{pmatrix} x_{i_1} & x_{i_2} & x_{i_3} & \ldots & x_{i_n} \\ y_{i_1} & y_{i_2} & y_{i_3} & \ldots & y_{i_n} \end{pmatrix} \quad (16)$$

where $(x_{i_k}, y_{i_k})$—are coordinates of $i_k$-th vertex $v_{i_k}$ in a map vertex set. Since each portfolio in the Efficient Set may be presented as an n-vector w of n weights:

$$w = \begin{pmatrix} w_1 \\ w_2 \\ \ldots \\ w_n \end{pmatrix}, \quad (17)$$

the formula for linear mapping of each portfolio may be defined as follows:

$$P(w) = Mw = \begin{pmatrix} x_{i_1} & x_{i_2} & x_{i_3} & \ldots & x_{i_n} \\ y_{i_1} & y_{i_2} & y_{i_3} & \ldots & y_{i_n} \end{pmatrix} \begin{pmatrix} w_1 \\ w_2 \\ \ldots \\ w_n \end{pmatrix} = \begin{pmatrix} \sum_{k=1}^{n} x_{i_k} w_k \\ \sum_{k=1}^{n} y_{i_k} w_k \end{pmatrix} \quad (18)$$

Referring again to the illustrative example and FIG. 3, the matrix operator M may be constructed as follows:

$$M_3 = \begin{pmatrix} 0 & 0 & 0 & 1 & -1 & 0 & 0 \\ 0 & 0 & 0 & 1 & 0 & -1 & 0 \end{pmatrix} \quad (19)$$

In this manner, mapping is provided for each of the portfolios in the Efficient Set. Each column in the matrix operator M represents one of the coordinates of the four vertices of the border 300.

In step 235, a subset of portfolios from the Efficient Set may be selected for projection onto the plane. In one embodiment, the subset may be one or more specific points corresponding to the level(s) of return or risk. The points may be distinguished on the plane by, for example, color, size, shape, etc., based on a value of a statistic (e.g., risk, return, Sharpe Ratio, etc.). Thus, the value of the statistic may be calculated for each point in the subset and used to determine the characteristic of the point as displayed on the plane.

According to the present invention, the set of portfolio weights $A = \{w_\lambda\}_{\lambda \in \Psi \subset \Phi}$ represents the subset of the set. A real-valued function $S(w)$, $w \in A$ on the set A determines the size, for example, of the point when the vector w is projected onto the plane. For example, for the Asset Allocation model the following options represent possible statistics which may be used to scale the points on the plane:

$$r(w) = e'w \text{ - expected return} \quad (20)$$

$$\sigma(w) = (w'Cw)^{1/2} \text{ - risk (standard deviation)}$$

$$R_s(w) = \frac{r - r_f}{\sigma} \text{ - SharpeRatio}$$

where $w \in A = \{w_\lambda\}_{\lambda \in \Psi \subset \Phi}$

If $f(x)$ represents any monotone real-valued function such as:

$$f(x_1) \geq f(x_2), \forall x_1, x_2 \in \square, \quad (21)$$

a first scaling function based on return for each point in the set A may be:

$$S(w) \equiv f(r(w)) = f(e'w)$$

$$w \in A = \{w_\lambda\}_{\lambda \in \Psi \subset \Phi} \quad (22)$$

A second scaling function based on a standard deviation for each point in the set A may be:

$$S(w) \equiv f(\sigma(w)) = f[(w'Cw)^{1/2}]$$

$$w \in A = \{w_\lambda\}_{\lambda \in \Psi \subset \Phi} \quad (23)$$

A third scaling function based on the Sharpe Ratio for each point in the set A may be:

$$S(w) = f(R_s(w)) = f\left(\frac{r - r_f}{\sigma}\right) \quad (24)$$

$$w \in A = \{w_\lambda\}_{\lambda \in \Psi \subset \Phi}$$

In one embodiment, the function $f(x)$ may be a linear function. In this embodiment, if a first size of the point corresponds to a smallest value of the function $S(w)$ equal to $d_{min}$, and a second size of the point corresponds to a largest value of $S(w)$ equal to $d_{max}$, then the linear function defining the sizes of all points in the set A can be defined as follows:

$$s_{min} = \min_{w \in A}[S(w)] \quad (25)$$

$$s_{max} = \max_{w \in A}[S(w)]$$

$$d(w) = d_{min} + (d_{max} - d_{min})\frac{(S(w) - s_{min})}{(s_{max} - s_{min})}, \quad \forall w \in A$$

Those of skill in the art will understand that a similar algorithm may be used to assign color codes rather then sizes to the points.

In step 240, the points are plotted on the plane. To generate the coordinates for each point, the matrix operator M is applied to each vector of weights in the subset. The X-Y coordinates are generated as follows:

$$x = \sum_{k=1}^{n} x_{i_k} w_k \quad (26)$$

$$y = \sum_{k=1}^{n} y_{i_k} w_k$$

The points may then be plotted on the plane. As stated above, the size, shape and/or color of each point may vary based on the value of the corresponding statistic. As understood by those of skill in the art, the points may be connected or best-fit with a line or a curve.

In the illustrative example, multiplying each portfolio by the matrix operator M generates the following coordinates for each point:

|  | X | Y |
|---|---|---|
| Eff Point 1 | −0.01 | 0.00 |
| Eff Point 2 | −0.02 | 0.00 |
| Eff Point 3 | −0.03 | 0.01 |

-continued

|  | X | Y |
|---|---|---|
| Eff Point 4 | −0.04 | 0.01 |
| Eff Point 5 | −0.06 | 0.02 |
| Eff Point 6 | −0.20 | 0.15 |
| Eff Point 7 | −0.39 | 0.33 |
| Eff Point 8 | −0.58 | 0.50 |
| Eff Point 9 | −0.85 | 0.74 |

Figure 4:
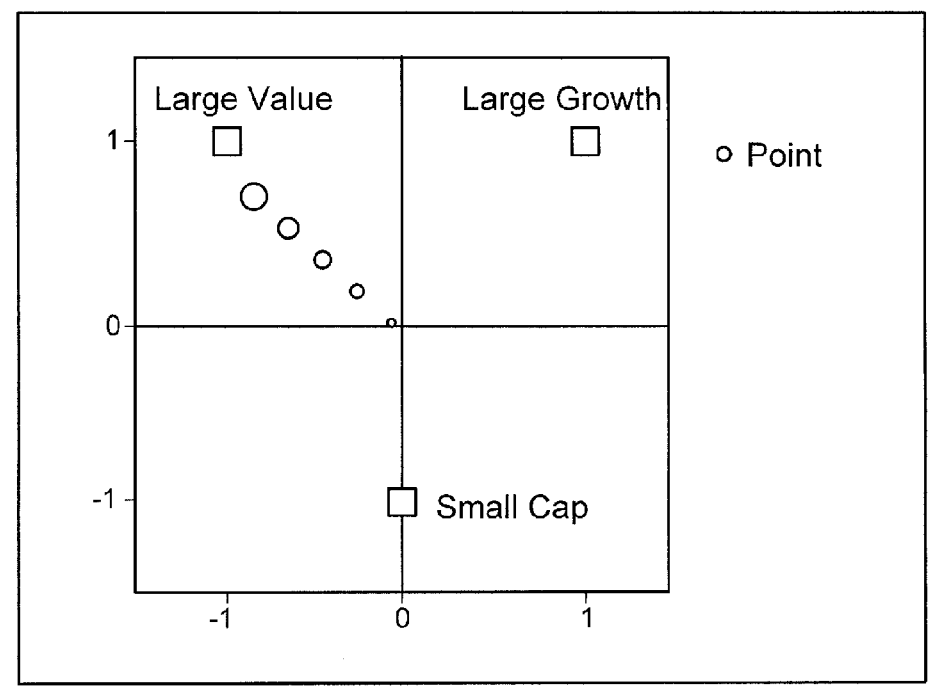
FIG. 4 shows an exemplary embodiment of a 2D chart according to the present invention.

These points may then be plotted on the plane, the result of which is shown in FIG. 4. Each circle on the plane represents the corresponding portfolio and a diameter of each circle increases as the risk level increases for the portfolio.

Figure 5:
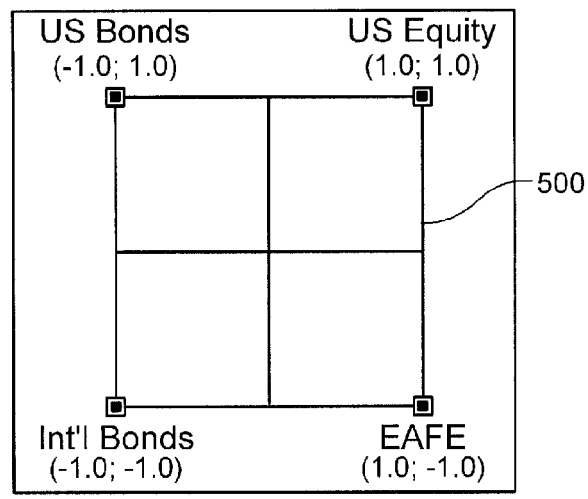
FIG. 5 shows another exemplary embodiment of the 2D plane according to the present invention.

In a further exemplary embodiment of the present invention, the graphical representation may be shown on a global investment map with or without reference to specific allocations within US Equity and US Fixed Income. In this embodiment, the following four assets may be utilized as the vertices of the plane: (1) US Bonds, (2) International Bonds, (3) US Equities and (4) International Equities. The plane may be created, for example, by placing the four assets as vertices of a border 500 as shown in FIG. 5.

The projection matrix $M_4$ shown below provides mapping for each of the 9 portfolio weights vector-rows in the set calculated above. Each column in the projection matrix M represents one of the coordinates of the four vertices of the plane.

$$M_4 = \begin{pmatrix} -1 & -1 & -1 & 1 & 1 & 1 & 1 \\ 1 & 1 & -1 & 1 & 1 & 1 & -1 \end{pmatrix} \quad (27)$$

Note that T-Bills and US Bonds (first and second column) are mapped into the same vertex labeled US Bonds with coordinates (−1.0,1.0) and all US Equity indices (columns 4-6) are mapped into the same vertex labeled US Equity with coordinates (1.0,1.0).

Multiplying each row vector of portfolio weights in the set calculated above by the projection matrix $M_4$ yields the following set of coordinates for the plane:

|  | X | Y |
|---|---|---|
| Eff Point 1 | −0.96 | 0.99 |
| Eff Point 2 | −0.92 | 0.99 |
| Eff Point 3 | −0.88 | 0.99 |
| Eff Point 4 | −0.85 | 0.99 |
| Eff Point 5 | −0.81 | 0.99 |
| Eff Point 6 | −0.49 | 0.83 |
| Eff Point 7 | −0.08 | 0.62 |
| Eff Point 8 | 0.33 | 0.41 |
| Eff Point 9 | 0.91 | 0.91 |

Figure 6:
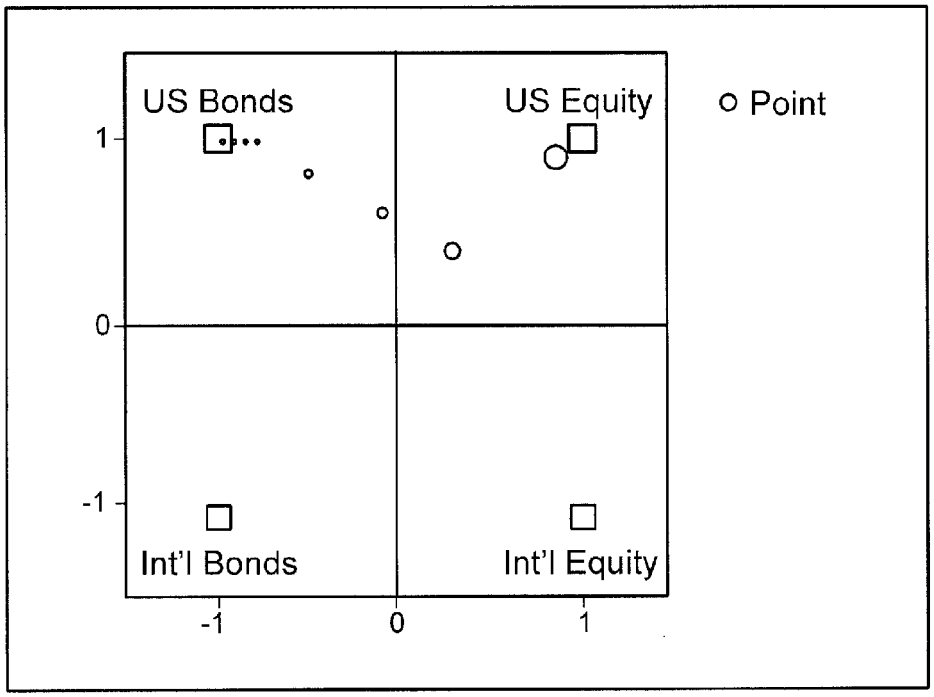
FIG. 6 shows another exemplary embodiment of the 2D chart according to the present invention.

When the coordinates are plotted on the plane, the result is shown in FIG. 6.

The present invention has been described with reference to specific exemplary embodiments thereof. It will, however, be evident that various modifications and changes may be made thereto without departing from the broadest spirit and scope of the present invention as set forth in the disclosure herein. Accordingly, the specification and drawings are to be regarded in an illustrative rather than restrictive sense.

What is claimed is:

1. A system for graphically representing in a space data representing at least one portfolio, comprising:
a memory arrangement storing a Multi-Criteria Financial Optimization ("MCFO"); and a processor solving the MCFO based on at least one input condition to generate data corresponding to a set of portfolios, the processor selecting vertex points corresponding to a set of components of the portfolios, the processor defining coordinates of the vertices on a chart, the processor defining a projection vector-function using coordinates of the vertices and selecting a subset of the portfolios on the chart, the processor computing coordinates for the portfolios in the subset using the projection vector-function and a weighting corresponding to the portfolios, the processor plotting points corresponding to the portfolios in the subset on the chart using the computed coordinates.

2. The system according to claim 1, wherein the space is one of 2D and 3D.

3. The system according to claim 1, wherein the chart is one of 2D and 3D.

4. The system according to claim 3, wherein when the chart is 2D, the coordinates are X-Y coordinates, and when the chart is 3D, the coordinates are X-Y-Z coordinates.

5. The system according to claim 1, wherein the processor defines the MCFO to include an objective function and at least one constraint.

6. The system according to claim 1, wherein the subset includes all of the portfolios in the set of portfolios.

7. The system according to claim 1, wherein the subset includes less than all of the portfolios in the set of portfolios.

8. The system according to claim 1, wherein each point includes at least one of a symbol and a line.

9. The system according to claim 1, wherein each point has at least one of a predetermined size and a color which corresponds to a characteristic of a corresponding one of the portfolios.

10. The system according to claim 1, wherein the MCFO is one of an Asset Allocation model and a Portfolio Optimization model.

11. The system according to claim 1, wherein the projection vector-function is a linear function of portfolio weights.

12. The system according to claim 1, wherein the projection vector-function represents a matrix with each column consisting of coordinates of the vertices.

13. The system according to claim 1, wherein the projection vector-function is a non-linear function.

14. A method for graphically representing in a space data representing at least one portfolio, comprising the steps of:
solving a Multi-Criteria Financial Optimization ("MCFO") based on at least one input condition to generate data corresponding to a set of portfolios; selecting vertex points corresponding to a set of components of the portfolios;
defining coordinates of the vertices on a chart; defining a projection vector-function using coordinates of the vertices; selecting a subset of the portfolios for projection on the chart;
computing coordinates for the portfolios in the subset using the projection vector-function and a weighting corresponding to the portfolios; and plotting points corresponding to the portfolios in the subset on the chart using the computed coordinates.

15. The method according to claim 14, wherein the space is one of 2D and 3D.

16. The method according to claim 14, wherein the chart is one of 2D and 3D.

17. The method according to claim 16, wherein when the chart is 2D, the coordinates are X-Y coordinates, and when the chart is 3D, the coordinates are X-Y-Z coordinates.

18. The method according to claim 14, further comprising the step of: defining the MCFO to include an objective function and at least one constraint.

19. The method according to claim 14, wherein the subset includes all of the portfolios in the set of portfolios.

20. The method according to claim 14, wherein the subset includes less than all of the portfolios in the set of portfolios.

21. The method according to claim 14, wherein each point includes at least one of a symbol and a line.

22. The method according to claim 14, wherein each point has at least one of a predetermined size and a color which corresponds to a characteristic of a corresponding one of the portfolios.

23. The method according to claim 14, wherein the projection vector-function is a linear function of portfolio weights.

24. The method according to claim 14, wherein the projection vector-function represents a matrix with each column consisting of coordinates of the vertices.

25. The method according to claim 14, wherein the projection vector-function is a non-linear function.

26. A non-transitory computer readable medium containing a set of instructions executable by a processor, the set of instructions comprising:
solving a Multi-Criteria Financial Optimization ("MCFO") based on at least one input condition to generate data corresponding to a set of portfolios;
selecting vertex points corresponding to a set of components of the portfolios;
defining coordinates of the vertices on a chart; defining a projection vector-function using coordinates of the vertices;
selecting a subset of the portfolios for projection on the chart;
computing coordinates for the portfolios in the subset using the projection vector-function and a weighting corresponding to the portfolios; and
plotting points corresponding to the portfolios in the subset on the chart using the computed coordinates.

* * * * *